No. 851,591. PATENTED APR. 23, 1907.
P. FORG.
VALVE HANDLE.
APPLICATION FILED APR. 16, 1903.
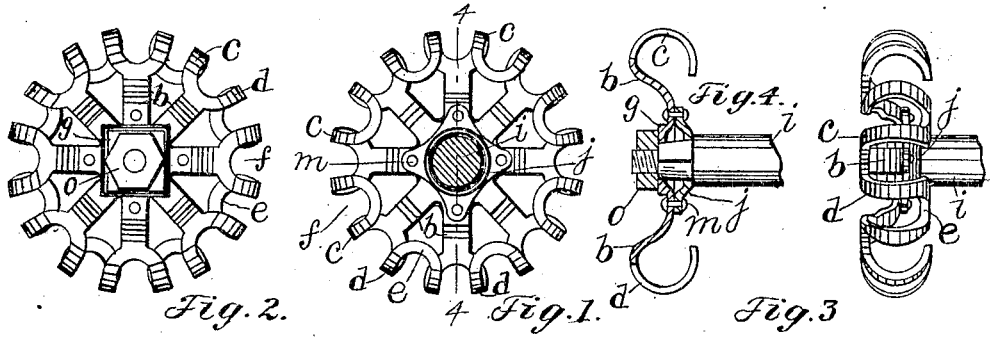
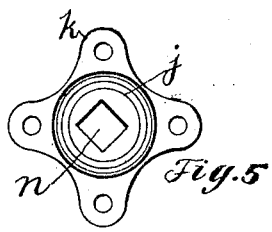
Witnesses.
Inventor.
Peter Forg
by Jas. H. Churchill
Atty.

UNITED STATES PATENT OFFICE.

PETER FORG, OF SOMERVILLE, MASSACHUSETTS.

VALVE-HANDLE.

No. 851,591.        Specification of Letters Patent.        Patented April 23, 1907.

Application filed April 16, 1903. Serial No. 152,861.

*To all whom it may concern:*

Be it known that I, PETER FORG, a citizen of the United States, residing in Somerville, in the county of Middlesex and State of Massachusetts, have invented an Improvement in Valve-Handles, of which the following description, in connection with the accompanying drawings, is a specification, like letters on the drawings representing like parts.

This invention relates to a heat radiating handle designed and adapted for use in connection with a rod or stem employed on structures or parts exposed to heat, such for instance, as steam valves, doors to heating apparatus, etc.

The invention further has for its object to provide a strong, inexpensive and efficient handle for the purpose specified.

The particular features of this invention will be pointed out in the claim at the end of this specification.

Figure 1 is an inner or rear elevation of a handle embodying this invention, the stem or rod to which it is attached being shown in section. Fig. 2, a front elevation of the handle shown in Fig. 1. Fig. 3, a side elevation. Fig. 4, a section on the line 4—4, Fig. 1. Fig. 5, a detail to be referred to.

The handle herein shown as embodying this invention may be made from a sheet steel or other metal blank and comprises a center piece *a* from which radiate a plurality of arms *b*, each having extended from its end fingers *c, d*, which diverge as herein shown and are joined at their ends to adjacent fingers by connecting pieces *e*.

The fingers *c, d* are bent or curved into substantially the position shown in Figs. 3 and 4, to form a substantially circular periphery for the handle, which periphery is composed of metal pieces separated by air spaces *f*.

The center portion *a* may be countersunk or offset to form a hub or boss *g* which is provided with an opening *h* through which the end of the rod or stem *i* may be extended.

The handle may be provided with an auxiliary support for the rod or stem, which support may be made as herein shown and consists of a spider composed of a cup-shaped center *j* and arms *k*, which latter are secured to the arms *b* by rivets *m* or in other suitable manner.

The cup-shaped center *j* is provided with a center opening *n* through which the rod or stem *b* is extended. The end of the rod or stem *i* may be square or of angular shape, and the openings in the center piece *a* and in the auxiliary support *j* are of corresponding shape to key the handle onto the stem or rod, and the said handle may be retained on the rod or stem by the nut *o* or in other suitable manner.

From the above description, it will be seen that heat conducted by the rod or stem *i* to the handle is dissipated by the open construction of the latter, so that the operator can grasp the handle without liability of being burned, while at the same time, the handle is strong and durable yet light.

Claim:

The combination with a sheet metal handle provided with a center portion having an offset provided with a hole or opening, arms extended from said center portion, fingers extended from said arms to leave air spaces and curved or bent, a finger on one arm being connected to a finger on an adjacent arm, of a spider secured to said center portion and provided with an opening in line with the opening in said center portion, substantially as described.

In testimony whereof, I have signed my name to this specification in the presence of two subscribing witnesses.

PETER FORG.

Witnesses:
     JAS. H. CHURCHILL,
     J. MURPHY.